United States Patent [19]

Peisker et al.

[11] Patent Number: 5,492,393
[45] Date of Patent: Feb. 20, 1996

[54] HUB CAP VENT DEVICE

[75] Inventors: Glenn W. Peisker, Barrington, Ill.; Dennis N. Denton, Gastonia, N.C.

[73] Assignee: SKF USA Inc., Elgin, Ill.

[21] Appl. No.: 306,631

[22] Filed: Sep. 15, 1994

[51] Int. Cl.[6] .................................................. B60B 7/00
[52] U.S. Cl. ................................. 301/108.1; 301/108.4
[58] Field of Search ............................ 301/108.1, 108.2, 301/108.3, 108.4; 55/522, 523

[56] References Cited

U.S. PATENT DOCUMENTS

| | | |
|---|---|---|
| 2,576,610 | 11/1951 | Kunzog . |
| 2,604,958 | 7/1952 | Leufvenius . |
| 2,655,041 | 10/1953 | Jacobsson . |
| 3,064,982 | 11/1962 | Stephens . |
| 3,114,579 | 12/1963 | Isenbarger . |
| 3,177,041 | 4/1965 | Isenbarger . |
| 3,316,022 | 4/1967 | Isenbarger . |
| 3,395,950 | 8/1968 | Brandt ............................ 301/108.1 X |
| 3,460,874 | 3/1969 | Johnson . |
| 3,649,080 | 3/1972 | Molinare . |
| 4,073,540 | 2/1978 | Jackowski . |
| 5,192,117 | 3/1993 | Kuck . |

OTHER PUBLICATIONS

Vented Hubcap Literature–CR Industries.

*Primary Examiner*—Russell D. Stormer
*Attorney, Agent, or Firm*—James T. FitzGibbon

[57] ABSTRACT

A hub cap for heavy duty axles. The hub cap includes a breather vent disc made from a non-metallic material partially fused so as to permit air flow therethrough in both a grease-free and a greased condition, such vent disc being mechanically secured to a disc carrier, and the carrier being received in fluid-tight relation to the end wall portion of the hub cap body.

12 Claims, 2 Drawing Sheets

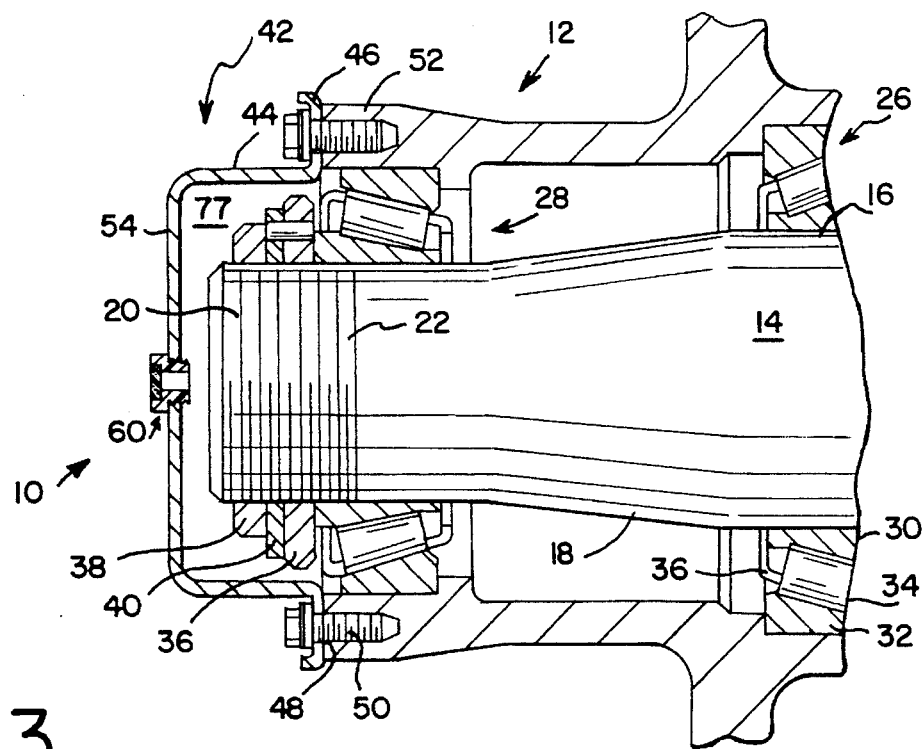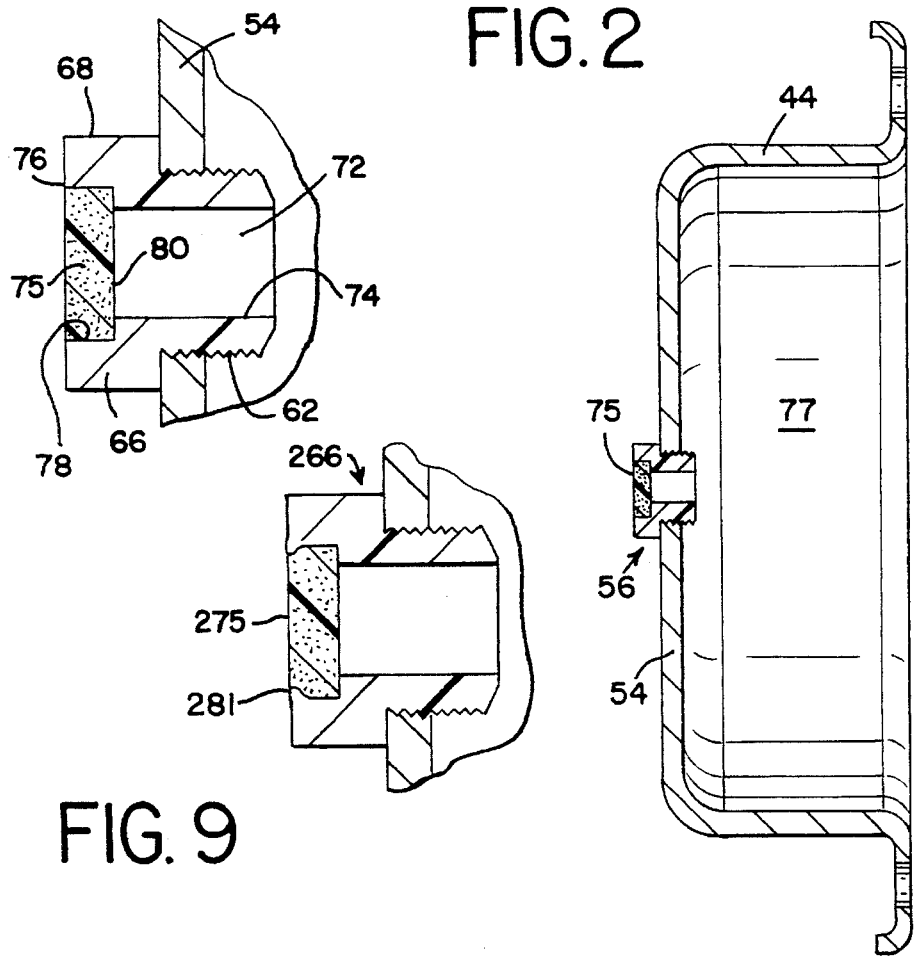

HUB CAP VENT DEVICE

BACKGROUND OF THE INVENTION

The present invention relates generally to improved vehicle hub caps, and in particular, to hub caps used in truck, tractor, trailer and semi-trailer applications having special lubrication requirements.

According to the invention, an improved hub cap vent is provided to permit pressure equalization between the sealed cavity and the outside atmosphere as the mechanism is exposed to a variety of working conditions.

As is well known, the wheel hub assemblies of trucks, tractors, and semi-trailers include a spindle locating a pair of anti-friction bearings, and a wheel hub carried by the outer races of such bearings. The bearing assemblies, often referred to as the inner and outer bearing sets, are lubricated by a bath of oil or a mass of grease, depending on the application and the preference of the user.

The lubricants are prevented from leaking from the sealed region by the provision of one or more oil seals, each usually having a casing portion and an elastomeric or other style seal lip portion. Relative rotation occurs between the elastomeric seal lip and an associated, relatively rotatable part, and a static or secondary seal is created between the seal casing and a relatively fixed part of the assembly, such as a seal housing or a counterbore.

Over the years, improvements have been made in these bearing assemblies and in the seals. In some instances, there has been a widespread replacement of older style greases with oil as the lubricating medium. This change has required certain improvements in the form of seal used in the application. More recently, with the advent of improved greases, there has been an increase in the number of applications using synthetic grease instead of oil to lubricate the wheel hub assemblies.

One of the problems sought to be addressed by the present invention is the control of pressure within the sealed region formed by portions of the wheel hub assembly and the seal unit itself. In use, the seals, bearings and axles are subjected to friction as the vehicle travels over the road, gradually undergoing an increase in temperature. When heated, the air, oil and in particular, any water within the sealed region tends to expand, particularly as the liquid water turns to vapor. This exerts a positive pressure on the interior of the sealed region. If not properly vented, this pressure can increase the radial load on the seal lip and cause premature wear.

In a similar manner, when a wheel hub, once heated by reason of use, even when vented, is suddenly cooled, a partial vacuum is created in the sealed region. Under some circumstances, such as if an axle is submerged in water, the liquid water or other contaminants can be drawn into the sealed region by the action of the partial vacuum created by sudden cooling. Under these circumstances, when the vehicle is used again and the temperature rises, higher pressures can again eventuate, or as sometimes happens, the water compromises the effectiveness of the lubrication, even causing premature bearing failure.

In some instances, proper venting has overcome this problem, but in certain instances, such efforts have not been completely successful. Accordingly, there has been a need for providing proper and effective venting or breathing action of the seal cavity to ensure continuous pressure balance or equalization between the inside and the outside of the sealed region, all without leakage of the lubricant.

In the past, attempts to achieve this result have been directed to different styles of vents. One form of vent uses a standard pressure relief type valve of the spring-loaded, ball check type. Other approaches have been to use the slit elastomer or duckbill type valve to achieve a one way venting action. Still other approaches vent another portion of the mechanism, such as the inner part of the axle housing. These efforts have been successful to some extent, but some such designs may lack the ability for rapid pressure equalization upon temperature drop. In addition, a certain pressure threshold is sometimes needed to create a venting action. Regarding axle housing vents, this approach is usually applicable only to driven axles wherein the vented area communicates with the hub area, and not to all axles generally.

More recently, it has been suggested that sintered metal plugs of the type well known to be used in many breather vent or filter applications can be used for relieving pressure while also theoretically excluding the presence of contaminants from sealed regions. Materials such as sintered bronze or copper particles, preferably small sintered spheres, pressed into predetermined shapes, have been used for this purpose. In theory, it is possible to obtain interstices of a carefully controlled size that should permit the passage of gasses and water vapor but exclude liquid flow therethrough.

Proposals of this type have envisioned the use of a cylinder or plug of sintered material having a significant axial direction relative to its radial extent and, in the sense of its aspect ratio, somewhat resembling a cigarette filter. Such a sintered bronze filter is described in U.S. Pat. No. 5,192,117, for example.

While this concept appears to have several advantages, in many instances, its performance has not been as satisfactory as might have been hoped. Tests with such systems have shown that when the inner surfaces of such breather or filter becomes covered with the type of grease contained within the seal cavity, the permeability of the filter is essentially reduced to zero at the pressure levels usually encountered in most applications.

In one such filter, for example, while air flow as high as 1,000 ml per minute through a disc with an area of 0.07 sq. in. at a pressure of 5 psi (0.35 atm.) was able to be achieved while the filter was new, clean and dry, this porosity dropped essentially to zero at 5 psi when the filter was coated with a 0.050" layer of the type of grease found in the seal cavity. Where a porous plug requires a press fit within a metal opening, the plug may be distorted or rendered almost impermeable as it is wedged in place in the opening.

Accordingly, whether the filter is contacted by grease as the result of the assembly process, or merely as an incident to being used for a time, the effect has been to eliminate the venting or breathing potential of the filter and render the hub caps substantially impermeable to passage of air and water vapor at the low to moderate pressure levels encountered. Such a hub cap creates a risk of premature seal failure, with the attendant expense and inconvenience.

According to the present invention, different materials, arranged in a different way, and having a different range of porosities are provided to achieve a breathing action which is capable of being maintained even in the event of being covered with the grease used to lubricate the bearings. In one preferred form, the hub cap is made from metal and includes a breather insert in the form of a plug having a center opening, a threaded shank portion, a counterbore, and a porous breather disc received therein. The elements are made from a similar material, preferably high density polyethylene, and thus are able to be spun welded or ultrasonically bonded to each other. The material is hydrophobic and is of a controlled porosity to achieve improved performance. The vent assembly may be removed but is intended to resist accidental or unintentional removal.

In another embodiment, the vent assembly takes the form of a ceramic breather disc which is located within a transparent window portion of a hub cap having a plastic body. The disc providing the breathing action is secured within an opening in an endwall of the hub cap as the vent opening shrinks down from its slightly enlarged diameter when hot to its room temperature diameter, thus entrapping the ceramic disc in the endwall. In an alternative embodiment, the ceramic disc is placed in the counterbore of a material, such as amorphous nylon, to which ultrasonic or heat energy is thereafter applied to form a ridge or rim overlying an outer margin of the disc to secure the same in place. This method can also be used to secure the plastic disc in place within the plug forming a part of the breather insert.

In view of the failure of the prior to provide a filter unit operable at comparatively low differential pressures and permitting gas and vapor flow in both directions while preventing inward liquid flow, it is an object of the present invention to provide a hub cap having an improved vent or breather unit.

Another object of the invention is to provide a plug type breather for a hub cap wherein the breather disc is made from sintered particles, preferably spherical, of a thermoplastic material.

A further object of the invention is to provide a breather vent for a heady duty vehicle hub cap wherein the vent is made from in disc form of ceramic materials surface bonded together and providing a controlled porosity by reason of internal passages or interstices between the particles making up the major portion of the breather disc.

A still further object of the invention is to provide a method of making hub caps which include breather discs of various non-metallic materials.

Yet another object of the invention is to provide an improved hub cap made from a plastic material and having received therein a breather disc which is secured in a vent opening by a shrinkage of the plastic material between the time it is removed in a heated condition from the mold in which it is formed and the time it achieves a lower, room or operating temperature.

Another object of the invention is to provide a plug assembly for use in heavy duty hub cap wherein the breather disc is made from a porous material, preferably made from sintered particles, and carried within a plug having a center passage and an exterior shank adapted to mate with a portion of the hub cap.

A further object of the invention is to provide a breathable hub cap which will resist clogging by grease but which will also minimize or eliminate ingestion of contaminants, including water, when the unit is suddenly cooled from a high operating temperature.

The foregoing and other objects and advantages of the present invention are achieved in practice by providing a hub cap having end and sidewall portions, a vent opening, and a breather disc incorporated therein and closing off an otherwise open passage, with the breather disc being secured against removal from the end or sidewall of the hub cap and being made from a porous non-metal low cost material able to be secured in the cap wall without deformation or damage during assembly.

The manner in which the foregoing and other objects and advantages of the invention are achieved in practice will become more clearly apparent when reference is made to the following detailed description of the preferred embodiments of the invention set forth by way of example and shown in the accompanying drawings wherein like reference numerals indicate corresponding parts throughout.

BRIEF DESCRIPTION OF THE DRAWINGS

FIG. 1 is a fragmentary vertical sectional view showing a wheel hub of the type with which the hub cap of the present invention is useful;

FIG. 2 is an enlarged vertical sectional view of the hub cap of FIG. 1, showing the composite plug insert used therein;

FIG. 3 is a still further enlarged fragmentary sectional view showing constructional details of the composite plug unit of the invention;

FIG. 9 is a view of a modified form of the plug shown in FIGS. 1–3.

DESCRIPTION OF THE PREFERRED EMBODIMENTS OF THE INVENTION

Figure 4:
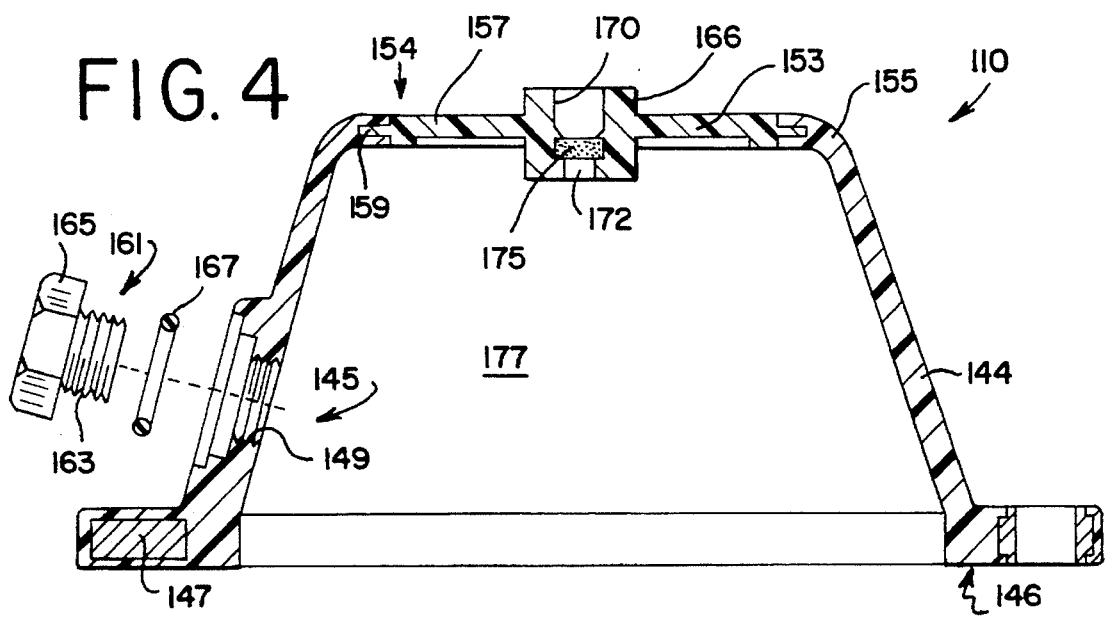
FIG. 4 is a vertical sectional view of an alternate form of hub cap, shown to utilize an alternate form of breather vent.

While the present invention comprehends the use of a certain variety of materials and different arrangements of such materials, two preferred forms of hub cap are shown to embody the invention. Basically, one such hub cap is a metal hub cap having a cuplike main body portion with a mounting flange and a center vent opening. The vent opening is filled by a composite plug unit which includes a carrier with a threaded shank, and a breather disc of porous plastic material, located within and positioned by the carrier. The other presently preferred form of the invention utilizes a hub cap having plastic end and sidewall portions, a mounting flange portion preferably reinforced with a metal, composite, or other mounting ring and a center transparent window portion having disposed therein a carrier section position by a breather disc of a porous ceramic material retained in place by one of two preferred methods. A still further form comprises a fastening arrangement wherein the open end of the hub cap is threaded for reception over a threaded end of the spindle or an associated part.

Referring now to the drawings in greater detail, FIG. 1 shows an improved vented hub cap generally designated 10 made according to the invention and shown to be secured in place over a rotary hub generally designated 12 on a truck axle or the like. As shown, an axle spindle 14 includes an axially inner spindle surface 16, an intermediate tapered surface 18 and a reduced diameter nose portion 20 containing threads 22 on its end. The hub 12 is journalled for rotation by axially inner and outer bearing sets generally designated 26, 28 and each shown to include an inner race 30, an outer race 32 and plural tapered roller bearings 34 held in place by a bearing cage 36.

The seals used to retain the lubricant in position adjacent the bearings are not shown in FIG. 1, it being understood that those skilled in the art are aware of the positioning, construction, and operation of such seals. Normally, the seals are positioned such that their casing is pressed into a counterbore in the hub. In some seals, an inner diameter casing is also provided and is positioned over the spindle, but other forms of seals are known. The actual seal itself, as known to those skilled in the art, is normally in the form of an elastomeric seal lip; however, leather may also be used as the primary seal material and as may be fluorocarbon resin materials, or specialty elastomers such as fluoroelastomers or the like. The exact construction of the seal and the materials comprising it are not necessary parts of the present invention.

The threaded nose 20 of the spindle 14 is shown to have secured thereover a thrust ring 36 engaging one surface of the bearing inner race and a locking nut 38 cooperating with the threads 22 on the shank. A spacer or washer 40 is also typically provided in such a construction. The hub cap 10 includes a main body portion generally designated 42 and shown to include a continuous sidewall 44, a mounting flange portion 46 including plural identical circumferentially spaced apart openings 48 for receiving threaded fasteners 50. The fasteners 50 are positioned in tapped openings located in an axially outer end portion 52 of the rotary hub 12.

According to the invention, the hub cap 10 also includes an endwall 54 having a breather vent assembly generally designated 56 (FIGS. 2, 3) disposed therein. The opening 58 in the endwall 54 includes threads 60 or the like formed therein to cooperate with threads 62 on the outer surface of the cylindrical shank 64 of a breather disc carrier generally designated 66.

The carrier 66 includes an enlarged, preferably cylindrical head portion 68 and a counterbore 70 of enlarged size relative to the main passage or center bore 72, which in turn is defined by a circular sidewall 74. A breather disc 75 made from sintered particles of high density polyethylene (HDPE) is secured in place along a spun-welded or ultrasonically bonded joint 76, formed between one of the counterbore sidewall surfaces 78 and the cylindrical outer surface of the disc. In the preferred form of product, the carrier 66 is threaded into a snug relation into the opening 58 and, by reason of its cylindrical head 68, the carrier is not readily removable from the endwall 54 of the hub cap 10.

Referring now to another embodiment of the invention, FIG. 4 shows a modified form of vented hub cap generally designated 110 and shown to have an endwall generally designated 154 comprised of a shoulder surface 155 and a transparent center or window section 157. The transparent section 157 includes a flat endwall portion 153, a cylindrical disc carrier section 166 having a main or center passage or bore 172, and an enlarged counterbore 170 for accommodating a breather disc 175. A tongue and groove joint generally designated 159 is shown to be provided near the point at which the shoulder 155 joins the flat endwall section 153 of the transparent center or window portion 157 of the assembly 110.

The remainder of the hub cap follows the same general concept as the hub cap 10 shown in FIGS. 1–3, but differs therefrom in detail. In this respect, the mounting flange generally designated 146 is shown to be molded integrally with the sidewall 144. Being made from plastic material, preferably an amorphous nylon, however, a metal insert mounting ring 147 is preferably provided for stiffening the flange 146 and passing the clamping forces from the bolts or other fasteners from the bolt heads to the hub end without excessively compressing the flange 146 adjacent the fasteners.

As an optional feature, the sidewall 144 may have an opening generally designated 145 therein defined by a threaded sidewall portion 149. The opening 145 can accommodate a removable plug generally designated 161 and shown to have a threaded shank 163, a flanged head 165 and to be associated with seal means in the form of an O-ring 167. The optional plug 161 can be removed for purposes of adding oil or grease to the sealed region 177 within the hub cap 110, if such addition is indicated by an inspection through the window 157.

Figure 5:
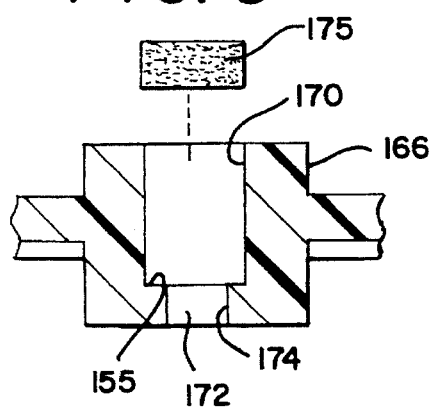
FIG. 5 is an enlarged fragmentary sectional view showing the breather vent of FIG. 4 in exploded relation relative to the carrier, prior to assembly therewith.
Figure 6:
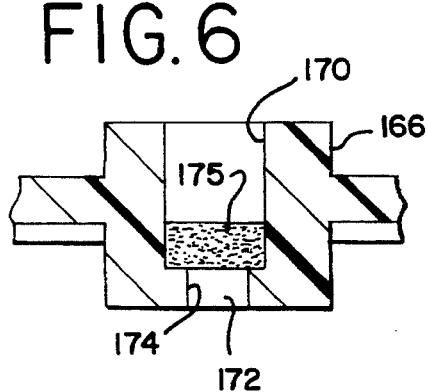
FIG. 6 is a view similar to that of FIG. 5 showing the breather vent in its assembled but not locked position.

Referring now to the improved vent assembly of FIGS. 4–8, and in particular to FIG. 5, it is shown that the carrier unit 166 includes the main bore or passage 172 defined by a circular sidewall 174 and a enlarged diameter counterbore sidewall surface 170. Where these surfaces meet, there is an annular shoulder 155 which is sized so as to permit seating of the breather disc 175 shown in exploded relation in FIG. 5. As shown in FIG. 6, during manufacture, the breather disc 175 is inserted into the counterbore and rests on the shoulder 155.

Figure 7:
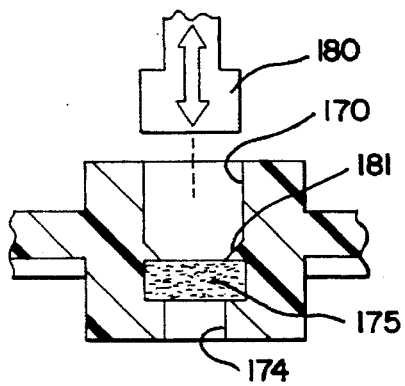
FIG. 7 is a view similar to that of FIGS. 5–6 and showing the tool used to create a bead locking the breather vent disc in position within the carrier.
Figure 8:
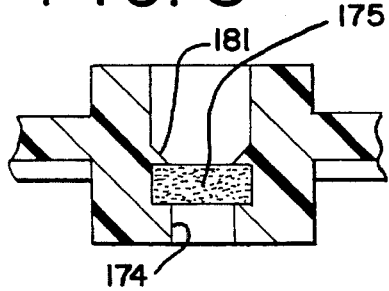
FIG. 8 is a view similar to that of FIGS. 5–7 showing the breather vent locked in place by the bead.

Next, as shown in FIG. 7, a tool 180 is inserted into the counterbore. The tool may comprise a heated die or a vibratory, ultrasonically driven punch. As it is forced into the counterbore, it engages the sidewall 170 of the counterbore and displaces a slight amount of the plastic material from which the carrier 166 is made, forming an inwardly extending bead 181 which is pushed into closely overlying relation to the outer margin of the end face of the breather disc 175. Thereupon, as shown in FIG. 8, when the punch or die is withdrawn, the bead 181 remains in place securing the disc 175 against removal.

Referring again to FIG. 5, a further alternate method of making the carrier and invention may be understood. Here, the positioning procedure is the same as that described above. However, the sintered breather disc 175 in this case is inserted into the counterbore 170 and held by the shoulder 155 immediately upon removing the hub cap as a whole from the mold wherein it has just been formed, usually by injection molding. This is done at an elevated temperature just below that at which the nylon or like thermoplastic material is in a fluent condition. A properly sized breather disc 175 may be easily positioned in the counterbore 170 at this temperature. When the hub cap resumes a room temperature, its shrinkage will have been sufficient to entrap the disc in a snug relation requiring no adhesives or supplemental fastening. The insertion may be done in the window 157 if, as sometimes happens, the window is molded first and then used as a mold insert while the remainder of the hub cap is injection molded around it.

Referring now to FIG. 9, a variation of the form of vent assembly shown in FIGS. 1–3 is illustrated. Here, the construction and operation of carrier 266 is the same as its counterpart 66. In fact, all the other elements are the same except that, instead of the breather disc 275 being secured by spin welding or ultrasonic bonding, the disc 275 is mechanically locked in place by creating a bead 281 overlying the margins of the disc 275. The bead may be formed by a tool such as the tool 180 described in connection with FIG. 7. Such a bead or other deformation of the counterbore 70 may be the sole manner of positioning the breather disc, or such bead may supplement other means of fastening the disc 275 in place within the carrier 266.

Referring now to the HDPE breather disc 75 shown in FIGS. 1–3, this material is sufficiently porous to permit vapor flow therethrough, and to resist blockage by a layer of grease or oil. However, the disc is impermeable to liquid water at low pressures, i.e., up to about 1 psi. Behavior of the disc in use is described elsewhere herein.

Referring now to the operation of the form of breather vent assembly 56 shown in FIGS. 1–3, it will be assumed that the lubricant reservoir space 77 defined by the hub cap, the other hub parts and the seal (FIG. 1) is filled with sufficient grease to lubricate both bearing sets. As the vehicle associated with the hub is operated and the rotary hub 12 spins on the bearing sets 26, 28, friction heats the various sealed parts, causing a rise of air temperature within the sealed cavity or space 77. In an unvented cavity, as the temperature arises, thermal expansion will tend to cause an increased pressure within the cavity 77.

If liquid water is present in this space, the water may be vaporized, wholly or in part, by the increased temperatures. Under circumstances where no vent is provided, therefore, this elevated pressure could augment the radial load on the seal lip and accelerate seal wear. However, because of the breather vent provided by the invention, in most instances, the cavity pressure will rise, if at all, by only a very small amount. As a desirable consequence, pressure equilibrium will be maintained through a range of temperatures.

Assuming now that the wheel hub is at an elevated operating temperature and is gradually cooled, the same circumstances will prevail. If, however, the hub is suddenly immersed in water, two causes of potential leakage are present. One potential cause is that the lowered temperature may cause a slight partial vacuum to be created in the space 77. The second possible cause is that the static head of water (usually only a few inches) will elevate the outside pressure and potentially cause water to leak inside the hub.

However, because of the controlled porosity of the breather vent, significant amounts of liquid water will not be able to pass through the breather disc at the levels of exterior pressure or interior partial vacuum able to be attained, especially in the time permitted. Such vacuum would be no larger than 2 or 3 psi, and the exterior pressure would be only a fraction of 1 psi. It will be appreciated that, because of the low heat capacity of the metal parts of the hub, cooling is rapid upon even initial immersion and may be substantial even before the vent reaches a subsurface level in the water. Thus, the intake would be air and not water.

Practice of one form of the invention was evaluated by performing air flow tests on specimens of breather vents. In the chart below, "HDPE 1" refers to a high density sintered polyethylene breather in the form of a disc having an effective or exposed diameter of 0.230 inches, i.e., a cross-section of about 0.41 inches and a thickness of 0.10 inches. The pore size of such specimen was, on the average, 60–70 microns, measured by a bubble-while-immersed porosity test. The largest pore size was as much as 100–110 microns, with the smallest size being of no concern.

The specimen referred to as HDPE 2 had an average 30 micron pore size, with some pores being 40 microns and, at the extreme, a few pores were 50 microns. The HDPE 2 disc was the same size of that of HDPE 1. The flow rate in ml per minute at the psi pressure levels shown in the left hand column are indicated in the table below.

The column entitled "Bronze" relates to the air flow through a smaller (0.125 inch) plug of sintered bronze of a thickness of 0.12 inches. The column entitled "Bronze—Corr." relates to a projected porosity assuming that the cross sectional area of the bronze plug, which is actually about 0.013 square inches, is increased so as to approximate the cross sectional area of the other specimens. The headings "HDPE 1 Grease" and "HDPE 2 Grease" refer to the porosity of the plugs to air when covered with a grease layer coating of 0.050".

Referring now to the ceramic disc described in connection with FIGS. 4–8, this is preferably made from a vitreous bonded aluminum oxide in what is commonly termed a pill press. In the preferred form, 99% of the oxide beads are of 60 micron or smaller particle size. The granular raw material is volumetrically fed into a punch and die set mounted in a hydraulic press. This material is compacted by a small ram on the hydraulic press to the exactly desired size. The "pill" or disc is then removed from the press in fragile condition and is subsequently heated in a furnace until the sintering process is complete. The following tables summarize porosity tests regarding the above materials.

| | AIR FLOW RATES IN ML/MINUTE | | | | |
|---|---|---|---|---|---|
| P, psi | HDPE-1 | HDPE-1 (Grease) | Bronze, Actual | Bronze, Corr. | Bronze (Grease) |
| 1 | 4300 | 575 | 190 | 640 | 0 |
| 2 | 7000 | 1500 | 300 | 1020 | 0 |
| 3 | 11500 | 4750 | 425 | 1440 | 0 |
| 4 | 13500 | 8250 | 500 | 1700 | 0 |
| 5 | 15600 | 13000 | 575 | 1950 | 0 |

| | AIR FLOW RATES IN ML/MINUTE | | | |
|---|---|---|---|---|
| P, psi | HDPE-2 | HDPE-2 (Grease) | Ceramic | Ceramic (Grease) |
| 1 | 1000 | 100 | 2250 | 140 |
| 2 | 1800 | 200 | 3750 | 280 |
| 3 | 2750 | 240 | 4600 | 350 |
| 4 | 3200 | 320 | 5500 | 680 |
| 5 | 3600 | 340 | 6250 | 1100 |

Referring now to the ability of the breather vent materials to exclude water, the HDPE 1 product was able to exclude about a 2 to 3 inch head of water with no initial pressure differential. The bronze specimen, ungreased, could seal a 24 inch head of water whereas a 15 to 18 inch head of water was able to be sealed by the HDPE 2 product. The ceramic vent was able to seal 6 to 12 inches of water.

Referring now to the venting phenomena, if no grease covers the vent, most or all of the described products would function very well in respect to providing a breather action for air and water vapor. When grease-coated, however, the bronze material was simply unable to vent at all, even at pressures up to 5 psi. It would be therefore most likely be undesirable in an application wherein the vent is susceptible to being covered with grease. When grease was applied to any of the HDPE materials, it was noted that venting behavior was quite different from grease-free-specimens. Thus, the flow rate at 5 psi in all instances of uncoated materials ranged from about 2.8 to about 3.6 (averaging 3.2) times the rate at 1 psi.

In the case of the bronze filter plug coated with grease, even a 5 psi differential was not sufficient to permit any breathing at all. With the more porous greased materials, such as HDPE 1, the initial flow rate was low and the final rate was almost 90% of the rate of an uncoated specimen. A "threshold" effect was thus demonstrated. Thus, at 1 psi, the greased product was 8 times less porous than the ungreased specimen; at 3 psi, the greased product demonstrated about one-third of the porosity that it displayed when grease-free, and the 5 psi rate was almost like that of an uncoated specimen.

Regarding the HDPE 2 material, its behavior somewhat mimics that of the uncoated material, except that its porosity was almost exactly 10 times lower at any pressure from 1 to 5 psi. It did not display any threshold phenomenon, in that its flow rate remained proportional to pressure. The ceramic material, when coated, displayed a pseudo-threshold, and thus somewhat resembled the HDPE 1 material. Its 3 psi porosity was some 2.5 times larger than its 1 psi porosity, and its 5 psi porosity was almost 8 times its 1 psi porosity.

Inasmuch as the volume to be vented is very modest in terms of the flow rate, any of the non-metal filters used in the preferred embodiments of the invention would have sufficient breathing capacity to be satisfactory, whereas the bronze filter or plug would be blocked by grease and would effectively not breathe.

Regarding water intake, while the HDPE 1 material provided minimal ability to resist a pressure head, it must be recalled that only in some cases is there total immersion in water. In virtually all cases, the temperature of the hub drops before the entire hub is actually immersed. During the time just prior to immersion, the interior and exterior air pressures can equalize through the porous vent. After that, flow through the vent is proportional to the pressure and/or vacuum, both of which are slight at the time of immersion. Because the thermal effects referred to above are only occasional, and are mild and short-lived, a slight theoretical porosity to water with good breathing is much more acceptable than a vent plug that is totally waterproof but will not breathe at all.

From the foregoing, it was concluded that a breather vent having the ability to flow about 100 ml per minute at 1 psi when greasy or at least about 800–1,000 ml per minute at 1 psi when clean, in the cross-sections described, is satisfactory. Such products can breathe at least 100 ml per minute even when grease coated. The ability of one such product to withstand an 18 inch head of water is believed more than sufficient to prevent ingress of measurable amounts of water even over an extended period because the static head pressure will never exceed about ½ psi. At this pressure, at most, the hub will ingest only a fraction of a drop of water during the time the hub temperature drops from a running temperature to the ambient temperature of the water. Thereafter, the breather will be impermeable to water.

It was also concluded that the use of the polyethylene or like plastic material or ceramic material having porosity sizes of 30–70 microns on average, and an ability to breathe through grease at the rate of about 100 ml per minute at a pressure of 1 psi in the specimen sizes referred to herein will achieve flow rates and provide exclusion behavior so as to make a highly satisfactory product.

Referring now to another aspect of the invention, the concept of a plastic carrier receiving and positioning an HDPE or a ceramic disc is important. Such materials are compatible with a manufacturing process wherein the breather disc is not subjected to undue forces which could compromise its structural integrity. As breather vent materials become more porous, i.e., have a lower solids content and greater pore size, they become less structurally rigid and are easily deformed if strong forces are applied during manufacture. It is thought possible, and in fact likely, that forcing plugs of sintered bronze material directly into metal hub caps in the manufacturing process has served to distort the bodies of the plugs and tends to reduce their permeability.

In the illustrated embodiments of hub caps, a bolt flange forms a part of the hub cap structure. However, in certain applications, the hub cap is secured to the hub mechanism by means of a screw-on mechanism. In such cases, a cylindrical extension of the hub cap sidewall is threaded on its exterior and a flange and an O-ring seal or the like are provided. Usually, such a hub cap has a hexagonal pattern or the like formings its sidewalls or includes a hex-head formed on its end face to facilitate application of the necessary installation torque. However, the exact fastening mechanism for the hub cap is not an important part of the invention.

Referring again to porosity of the materials, while air flow is proportional to the exposed area, the air flow does not vary significantly with thickness in the applications under consideration. Usually, the thickness of the disc will be from about 0.1 to about 0.2 inches.

Hub caps made according to the present invention provide an excellent combination of water and contaminant exclusion under most or all recently anticipated conditions, while providing a much improved venting behavior under all conditions. The ability to position the venting discs without distortion is important in maintaining quality control over the products in question.

It will thus be seen the present invention provides a new and improved hub cap having a number of advantages and characteristics including those pointed out herein and others which are inherent in the invention. Several preferred embodiments having been described by way of illustration, it is anticipated that modifications to the described forms of product will occur to those skilled in the art and that such modification and changes may be made without departing from the spirit of the invention or the scope of the appended claims.

We claim:

1. A vehicle hub cap comprising, in combination, a hub cap body having side and endwall portions, a fastening portion adapted to cooperate with a portion of a rotary vehicle hub, and a breather vent assembly, said breather vent assembly comprising, in combination, a breather vent disc and a breather vent disc carrier positioned within said cap body end wall and having a center vent opening in which said disc is secured in mechanically snug relation, said disc being made from fine particles of a non-metallic material, with portions of the exterior surfaces of said particles being fused to one another so as to leave plural breathing passages between said particles, said passages providing a porosity such that, when clean, a disc of said material having an exposed diameter of about 0.15 square inches will permit air to flow therethrough at from about 800 cc to about 5,000 cc per minute at 1 psi, and when coated with grease, said disc will permit at least 80– 100 cc's of air per minute at 1 psi to pass therethrough.

2. A hub cap as defined in claim 1, wherein said breather vent disc carrier is in the form of a plastic element having a body with a shank portion and an enlarged head portion, wherein said center opening comprises a bore extending axially through said shank and a counterbore, extending into said body from said head portion, and with said disc being made from high density polyethylene particles sintered together.

3. A hub cap as defined in claim 2, wherein said breather vent disc carrier is also made from a thermoplastic material and said breather vent disc is retained in said counterbore by being spun welded to said vent opening sidewall.

4. A hub cap as defined in claim 2, wherein said breather vent disc carrier is made from a thermoplastic material and said breather vent disc is retained in said counterbore by being ultrasonically welded to said vent opening sidewall.

5. A hub cap as defined in claim 2, wherein said breather vent disc is secured within said counterbore by a bead overlying the radially outer margins of the outer end face portion of said breather vent disc.

6. A hub cap as defined in claim 2, wherein said hub cap is made from metal, wherein said shank portion of said carrier element and a portion of said hub cap contain cooperating threads for securing said carrier to said hub cap.

7. A hub cap as defined in claim 1, wherein said hub cap and said breather vent disc carrier are both made from the same plastic material and wherein said breather vent disc carrier is positioned within said cap body end wall by being formed as an integral portion of said end wall.

8. A hub cap as defined in claim 7, wherein said breather vent disc is made from individual particles of a ceramic material having portions of their exterior surfaces fused to one another so as to leave plural passages between said particles.

9. A hub cap as defined in claim 7, wherein said breather vent disc carrier center opening includes cylindrical sidewall portions defining a reduced diameter portion and an enlarged counterbore portion said portions combining to define a vent passage shoulder, and with said breather vent disc being positioned in facing relation to said shoulder and being retained in said counterbore portion by an interference fit.

10. A hub cap as defined in claim 9, wherein said interference fit is created by post-molding thermal shrinkage of said counterbore.

11. A hub cap as defined in claim 9, wherein said breather vent disc is secured within said counterbore by a bead overlying an outer margin of the end face of said disc and being formed from the material comprising said carrier body.

12. A hub cap as defined in claim 11, wherein said bead is formed by ultrasonically deforming said sidewall forming a portion of said counterbore.

* * * * *